United States Patent
Yamaguchi et al.

(10) Patent No.: US 7,087,855 B2
(45) Date of Patent: Aug. 8, 2006

(54) PLASMA CUTTING APPARATUS AND CONTROL UNIT THEREOF

(75) Inventors: Yoshihiro Yamaguchi, Komatsu (JP); Tetsuya Kabata, Komatsu (JP)

(73) Assignee: Komatsu Industries Corporation, Komatsu (JP)

( * ) Notice: Subject to any disclaimer, the term of this patent is extended or adjusted under 35 U.S.C. 154(b) by 6 days.

(21) Appl. No.: 10/840,676

(22) Filed: May 7, 2004

(65) Prior Publication Data
US 2005/0035093 A1   Feb. 17, 2005

(30) Foreign Application Priority Data
May 28, 2003   (JP)   ............... 2003-150890

(51) Int. Cl.
*B23K 10/00*   (2006.01)
(52) U.S. Cl. .................. 219/121.39; 219/121.44; 219/121.54
(58) Field of Classification Search ........... 219/121.39, 219/121.44, 121.59, 121.54, 121.57, 121.55, 219/121.56, 75; 700/160, 166, 168, 165, 700/174, 175
See application file for complete search history.

(56) References Cited
U.S. PATENT DOCUMENTS

| | | | | |
|---|---|---|---|---|
| 5,326,955 A | * | 7/1994 | Nishi et al. ............ | 219/121.56 |
| 5,506,384 A | * | 4/1996 | Yamaguchi ............ | 219/121.57 |
| 6,222,154 B1 | * | 4/2001 | Yamaguchi et al. ... | 219/121.39 |
| 6,274,842 B1 | * | 8/2001 | Warren et al. ......... | 219/121.44 |
| 6,772,040 B1 | * | 8/2004 | Picard et al. ........... | 700/166 |
| 2005/0077271 A1 | * | 4/2005 | Delzenne ............... | 219/121.44 |

FOREIGN PATENT DOCUMENTS

| | | |
|---|---|---|
| JP | 3231899 | 1/1995 |
| JP | 10-29068 | 2/1998 |
| JP | 10-244375 | 9/1998 |
| JP | 2000-317639 | 11/2000 |
| JP | 2001-1150 | 1/2001 |
| JP | 2001-1154 | 1/2001 |

* cited by examiner

*Primary Examiner*—Mark Paschall
(74) *Attorney, Agent, or Firm*—Armstrong, Kratz, Quintos, Hanson & Brooks LLP

(57) ABSTRACT

Cutting quality of the product, in particular, hole cutting quality, in plasma arc cutting is improved. A control unit, which controls a plasma cutting apparatus for cutting a product from a plate material by moving a plasma torch at a cutting speed along a cutting path corresponding to the product shape to cut the plate material, while supplying an arc current and a plasma gas to the plasma torch and forming a plasma arc from a nozzle of the plasma torch to the plate material, conducts control so that, when a hole is cut, a cutting speed is lower, a value of the arc current value is smaller, and a plasma gas flow rate or pressure is less than those when a contour is cut.

14 Claims, 11 Drawing Sheets

FIG. 8

| CODE | MATERIAL | PLATE THICKNESS | NOZZLE |
|---|---|---|---|
| A1 | SS400 | 1.2 | 0.6 |
| A2 | SS400 | 1.6 | 0.6 |
| A3 | SS400 | 2.3 | 0.6 |
| A4 | SS400 | 3.2 | 0.6 |
| A5 | | | |
| A6 | SS400 | 1.6 | 0.8 |
| A7 | SS400 | 2.3 | 0.8 |
| A8 | SS400 | 3.2 | 0.8 |
| A9 | SS400 | 4.5 | 0.8 |
| A10 | SS400 | 6.0 | 0.8 |
| A11 | SS400 | 4.5 | 1.1 |
| A12 | SS400 | 6.0 | 1.1 |
| A13 | SS400 | 9.0 | 1.1 |
| A14 | SS400 | 12.0 | 1.1 |
| A15 | SS400 | 9.0 | 1.3 |
| A16 | SS400 | 12.0 | 1.3 |
| A17 | SS400 | 16.0 | 1.3 |
| A18 | SS400 | 19.0 | 1.3 |
| A19 | SS400 | 22.0 | 1.3 |
| A20 | SS400 | 25.0 | 1.3 |

| CODE | MATERIAL | PLATE THICKNESS | NOZZLE |
|---|---|---|---|
| A21 | SUS304-02 | 1.0 | 0.8 |
| A22 | SUS304-02 | 2.0 | 0.8 |
| A23 | SUS304-02 | 3.0 | 0.8 |
| A24 | SUS304-02 | 4.0 | 0.8 |
| A25 | SUS304-02 | 5.0 | 0.8 |
| A26 | SUS304-02 | 6.0 | 1.1 |
| A27 | SUS304-02 | 9.0 | 1.1 |
| A28 | SUS304-02 | 10.0 | 1.3 |
| A29 | SUS304-02 | 12.0 | 1.3 |
| A30 | SUS304-02 | 15.0 | 1.3 |
| A31 | SUS304-02 | 20.0 | 1.3 |
| A32 | A5052 | 1.0 | 0.8 |
| A33 | A5052 | 2.0 | 0.8 |
| A34 | A5052 | 3.0 | 0.8 |
| A35 | A5052 | 4.0 | 0.8 |
| A36 | A5052 | 5.0 | 0.8 |
| A37 | A5052 | 6.0 | 1.1 |
| A38 | A5052 | 8.0 | 1.1 |
| A39 | A5052 | 10.0 | 1.3 |
| A40 | A5052 | 15.0 | 1.3 |

| CODE | MATERIAL | PLATE THICKNESS | NOZZLE |
|---|---|---|---|
| A41 | | | |
| A42 | | | |
| A43 | SUS304-N2 | 3.0 | 1.1 |
| A44 | SUS304-N2 | 4.0 | 1.1 |
| A45 | SUS304-N2 | 5.0 | 1.1 |
| A46 | SUS304-N2 | 6.0 | 1.1 |
| A47 | SUS304-N2 | 9.0 | 1.1 |
| A48 | SUS304-N2 | 10.0 | 1.3 |
| A49 | SUS304-N2 | 12.0 | 1.3 |
| A50 | SUS304-N2 | 15.0 | 1.3 |
| A51 | | | |
| A52 | | | |
| A53 | | | |
| A54 | | | |
| A55 | | | |
| A56 | | | |
| A57 | | | |
| A58 | | | |
| A59 | | | |
| A60 | | | |

| CODE | MATERIAL | PLATE THICKNESS | NOZZLE |
|---|---|---|---|
| A61 | | | |
| A62 | | | |
| A63 | | | |
| A64 | | | |
| A65 | | | |
| A66 | | | |
| A67 | | | |
| A68 | | | |
| A69 | | | |
| A70 | | | |
| A71 | | | |
| A72 | | | |
| A73 | | | |
| A74 | | | |
| A75 | | | |
| A76 | | | |
| A77 | | | |
| A78 | | | |
| A79 | | | |
| A80 | SS400 | 16.0 | 1.1 |

FIG. 9

| PLATE THICKNESS | | 9.0 | | | | | | | | | | 12.0 | | | | | | | | | | 16.0 | | | | | | | | | | |
|---|---|---|---|---|---|---|---|---|---|---|---|---|---|---|---|---|---|---|---|---|---|---|---|---|---|---|---|---|---|---|---|---|
| A CODE | | A13 | | | | | A15 | | | | | A14 | | | | | A16 | | | | | (A80) | | | | | A17 | | | | | |
| NOZZLE DIAMETER | mm | φ1.1 | | | | | φ1.3 | | | | | φ1.1 | | | | | φ1.3 | | | | | φ1.1 | | | | | φ1.3 | | | | | |
| SHIELD CAP | | USED | | | | | USED | | | | | USED | | | | | USED | | | | | USED | | | | | USED | | | | | |
| GUIDE SWIRLER | | O RING ORANGE COLOR | | | | | O RING ORANGE COLOR | | | | | O RING ORANGE COLOR | | | | | O RING ORANGE COLOR | | | | | O RING ORANGE COLOR | | | | | O RING ORANGE COLOR | | | | | |
| PILOT CURRENT VALUE | Amp | 22 | | | | | 25 | | | | | 22 | | | | | 25 | | | | | 22 | | | | | 25 | | | | | |
| PROCESSING CHANNEL | | TO | | T1 | T2 | T3 | TO | | T1 | T2 | T3 | TO | | T1 | T2 | T3 | TO | | T1 | T2 | T3 | TO | | T1 | T2 | T3 | TO | | T1 | T2 | T3 |
| | | HIGH SPEED | LOW SPEED | | | | HIGH SPEED | LOW SPEED | | | | HIGH SPEED | LOW SPEED | | | | HIGH SPEED | LOW SPEED | | | | HIGH SPEED | LOW SPEED | | | | HIGH SPEED | LOW SPEED | | | | |
| ARC CURRENT VALUE | Amp | 90 | 90 | 90 | 80 | 80 | 130 | 130 | 130 | 120 | 120 | 95 | 95 | 95 | 90 | 85 | 135 | 135 | 135 | 120 | 120 | 95 | 95 | 95 | 85 | 85 | 135 | 135 | 135 | 120 | 120 |
| CUTTING SPEED | mm/min | 2500 | 1300 | 1500 | 1000 | 1000 | 3000 | 1500 | 2000 | 1200 | 1200 | 2000 | 1200 | 1500 | 600 | 600 | 2500 | 1800 | 1000 | 1000 | 800 | 1000 | 1000 | 800 | 800 | 600 | 2000 | 1200 | 1200 | 600 | 600 |
| CUTTING HEIGHT | mm | 2.3 | 2.5 | 2.5 | 2.5 | 2.3 | 2.3 | 2.5 | 2.5 | 2.5 | 2.5 | 2.3 | 2.5 | 2.5 | 2.5 | 2.3 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| PIERCING HEIGHT | mm | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| CORRECTION NUMBER | | 11 | 11 | 11 | 11 | 10 | 13 | 13 | 13 | 13 | 12 | 11 | 12 | 12 | 12 | 10 | 13 | 13 | 13 | 14 | 12 | 11 | 11 | 11 | 12 | 12 | 13 | 13 | 13 | 14 | 14 |
| (CORRECTION AMOUNT) | mm | 1.1 | 1.1 | 1.1 | 1.1 | 1.0 | 1.3 | 1.3 | 1.3 | 1.3 | 1.2 | 1.1 | 1.2 | 1.2 | 1.2 | 1.0 | 1.3 | 1.3 | 1.3 | 1.4 | 1.2 | 1.1 | 1.1 | 1.1 | 1.2 | 1.2 | 1.3 | 1.3 | 1.3 | 1.4 | 1.4 |
| ASSIST GAS FLOW RATE | l/min | 60 | 35 | 35 | 15 | 10 | 55 | 35 | 45 | 15 | 10 | 50 | 35 | 35 | 15 | 10 | 60 | 40 | 40 | 15 | 10 | 55 | 45 | 55 | 25 | 10 | 65 | 40 | 40 | 30 | 10 |
| MAIN GAS FLOW RATE | | 1 | 1 | 1 | 2 | 2 | 1 | 1 | 1 | 2 | 2 | 1 | 1 | 1 | 2 | 2 | 1 | 1 | 1 | 2 | 2 | 1 | 2 | 1 | 2 | 2 | 1 | 1 | 1 | 2 | 2 |
| MIXED NITROGEN NUMBER | | 2 | 2 | 2 | 1 | 1 | 3 | 3 | 3 | 1 | 1 | 2 | 2 | 2 | 1 | 1 | 3 | 3 | 3 | 1 | 1 | 2 | 1 | 2 | 1 | 1 | 3 | 3 | 3 | 1 | 1 |
| START GAS PRESSURE | Mpa | 0.2 | | | | | 0.2 | | | | | 0.2 | | | | | 0.2 | | | | | 0.2 | | | | | 0.2 | | | | | |
| ANTISPUTTERING AGENT | | USED | | | | | USED | | | | | USED | | | | | USED | | | | | USED | | | | | USED | | | | | |
| PIERCE T | sec | 0 | | | | | 0 | | | | | 0 | | | | | 0 | | | | | 0 | | | | | 0 | | | | | |
| RISING PIERCE | | EFFECTIVE | | | | | EFFECTIVE | | | | | EFFECTIVE | | | | | EFFECTIVE | | | | | EFFECTIVE | | | | | EFFECTIVE | | | | | |
| PIERCING HEIGHT | mm | 2.5 | | | | | 2.5 | | | | | 2.5 | | | | | 2.5 | | | | | 2.5 | | | | | 2.5 | | | | | |
| RISE QUANTITY | mm | 4 | | | | | 4 | | | | | 5 | | | | | 5 | | | | | 7 | | | | | 7 | | | | | |
| SPEED | mm/min | 5000 | | | | | 5000 | | | | | 5000 | | | | | 5000 | | | | | 5000 | | | | | 5000 | | | | | |

PLASMA CUTTING APPARATUS AND CONTROL UNIT THEREOF

CROSS-REFERENCE TO RELATED APPLICATIONS

This application relates to and claims priority from Japanese Patent Application No. 2003-150890 filed on May 28, 2003, the entire disclosure of which is incorporated herein by reference.

BACKGROUND OF THE INVENTION

1. Field of the Invention

The present invention relates to a plasma cutting apparatus for cutting products from a plate material and to a control unit thereof.

2. Description of the Related Art

A plasma cutting apparatus for conducting plasma arc cutting by supplying a rotating flow of an assist gas into the zone around a rotating plasma arc, the flow rotating in the same direction as the arc, is known as a plasma cutting apparatus of this type. In plasma arc cutting, the cross section of the plate material assumes a tapered shape which narrows downward due to a plasma arc contraction, but in such a plasma cutting apparatus, the bevel angle formed by the cutting surface and the surface perpendicular to the lower surface of the plate material (in other words, the degree of tapering of the cutting surface) can be adjusted by adjusting the assist gas rotation intensity (or assist gas flow rate).

However, the degree of tapering of the cutting surface usually differs depending on cutting speed. For this reason, for example, even if the rotation intensity of the assist gas (or assist gas flow rate) is set so that the bevel angle is exactly zero degrees, when the cutting speed changes, the bevel angle is overcorrected and does not become zero degrees.

Furthermore, as shown in FIG. 1, a phenomenon of cutting delay at the lower side with respect to the upper side is observed at a cutting frontmost surface 110 of a plate material 300 (a distance 130 corresponding to the delay of cutting at the lower edge with respect to the upper edge of the cutting frontmost surface will be hereinbelow referred to as "cutting delay"). For this reason, in particular, in locations with significant changes in cutting direction, as in the corners and sharp curves, a positional shift occurs between a trajectory 150 on the upper side and a trajectory 170 on the lower side of a cutting groove 50.

In order to avoid the degradation of cutting quality caused by the aforementioned effects, a plasma cutting method was suggested in which an advantageous bevel angle is obtained by adjusting the assist gas flow rate (or assist gas rotation intensity) according to the cutting speed, more specifically, by making the assist gas flow rate (or assist gas rotation intensity) comparatively high when the cutting speed is comparatively high and making the assist gas flow rate (or assist gas rotation intensity) comparatively low when the cutting speed is comparatively low (for example, Japanese Patent Application Laid-open No. 2000-317639).

However, even when plasma arc cutting is conducted by the aforementioned method representing conventional technology, when a hole is cut in the product, the cutting quality is not necessarily good. This is due to the reasons (1) to (4) as follows.

(1) Cutting Delay

Because the hole size is extremely small by comparison to that of the product contour, when the hole is cut, the effect of cutting delay is stronger than when the contour is cut. For example, as shown in FIG. 2, if cutting delay occurs in hole cutting, the diameter DL on the lower side becomes less than the diameter DU on the upper side of the hole 310 and this is readily visible.

(2) Flow of Plasma Arc in the Center Direction Caused by Gas Flow

In contour cutting, no space appears on the left and right sides of plasma arc with respect to the plasma arc movement direction during cutting (in other words, no space appears on the left and right sides of the cutting groove). For this reason, almost equal pressure acts from the right and left sides on the plasma arc. However, in hole cutting, when the hole diameter is small with respect to a cutting groove width formed by plasma arc cutting, a space is sometimes formed on the right or left side (in other words, on the hole center side) of the plasma arc during cutting. For this reason, the pressure pushing the plasma arc toward the hole center sometimes becomes higher than the pressure pushing the plasma arc to the outside of the hole. As a result, during hole cutting, the plasma arc flows toward the hole center, which results in different trajectories on the upper side and lower side of the hole and a state, for example such as shown in FIG. 2, is assumed.

(3) Peaks and Valleys Appearing on the Cutting Surface

In most cases when hole cutting is conducted, as shown in FIG. 3, the hole 310 is formed and cut by piercing a prescribed location P1 on the inner side of the hole 310 with a plasma arc, then forming a plasma arc, moving the plasma arc into the prescribed location (referred to as "circling start position") PS on the outline of the hole 310, and then rotating the plasma arc along the outline of the hole 310 from the circling start position PS (the dot line shows the curve trajectory). In this process, the cutting frontmost surface formed by the plasma arc is curved and because of the above-described phenomena, such as cutting delay and plasma arc flow toward the center, even if the plasma arc is rotated with good accuracy along the outline of the hole 310, a certain displacement occurs between the circling start position PS and circling end position PG of the plasma arc, that is, the location of the plasma arc at the moment the hole 310 was formed, the cutting frontmost surface produced by plasma arc is produced, but is not curved, and therefore peaks and valleys 320 appear on the cutting surface.

(4) Degradation of the Nozzle of the Plasma Torch Ejecting the Plasma Arc

As the number of cutting cycles increases, the nozzle of the plasma torch for spraying the plasma arc is degraded. As a result, the pressure balance on the left and right sides with respect to the plasma arc sometimes becomes different. In hole cutting, as was described in section (2) hereinabove, this pressure balance affects cutting quality to a greater extent than in contour cutting. For this reason, if the nozzle is degraded with the increase in the number of cutting cycles, the hole cutting quality may be also degraded.

Among the above-described factors (1) to (4), at least the cutting delay, which is the factor (1), is practically unimportant in terms of hole cutting quality, but adversely affects cutting quality of the product contour.

SUMMARY OF THE INVENTION

Therefore, it is an object of the present invention to improve product cutting quality, especially hole cutting quality, in plasma arc cutting.

The numbers presented in the parenthesis in the description correspond to the elements described in the appended drawings. This is merely done to facilitate the explanation and should not be construed as limiting the technological scope of the present invention.

The plasma cutting apparatus (1) in accordance with the present invention serves for cutting a product from a plate material (W) by moving a plasma torch (6) at a cutting speed along a cutting path corresponding to the product shape to cut the plate material (W), while supplying an arc current and a plasma gas to the plasma torch (6) and forming a plasma arc (A) from a nozzle of the plasma torch (6) to the plate material (W), and this plasma cutting apparatus comprises a control unit (36) for controlling a cutting state including the cutting speed, an arc current value, and a plasma gas flow rate or pressure. The control unit (36) conducts control so that, when the shape of the product comprises a hole and a contour and when the hole is cut, the cutting speed is lower (for example, not more than 2000 mm/min, preferably, not more than 1500 mm/min), a value of the arc current is smaller, and a plasma gas flow rate or pressure is less than those when the contour is cut.

With the plasma cutting apparatus (1), when a hole is cut, the cutting speed is lower than that during contour cutting. Therefore, the effect of cutting delay on cutting quality can be decreased. Furthermore, because the value of arc current and the plasma gas flow rate or pressure are decreased as the cutting speed is reduced, gas spraying of the plasma arc (A) during hole cutting is weakened by comparison with that during contour cutting. As a result, the adverse effect of at least one factor of the cutting delay, pressure balance on the left and right side of the plasma arc (A), degradation of nozzle, and peaks and valleys appearing on the cutting surface (referred to hereinbelow as "cutting delay and the like") on cutting quality can be decreased.

In the first preferred embodiment, an assist gas is further supplied to the plasma torch (6), and the control unit (36) conducts control so that when the hole is cut, the assist gas flow rate or pressure is less than that when the contour is cut. As a result, the adverse effect of cutting delay and the like on cutting quality can be further reduced.

In the second preferred embodiment, when the hole is cut, the control unit (36) controls the cutting state according to the ratio of the plate thickness of the plate material (W) and the diameter of the hole. The experiments conducted by the assignee demonstrated that the degree of the adverse effect produced by cutting delay and the like on cutting quality differs depending on the ratio of plate thickness and hole diameter. With this in view, in the second preferred embodiment, even if the plate thickness and hole diameter differ independently, if the ratio thereof is the same, hole cutting is conducted in the same cutting state. Conversely, even if the plate thickness is the same, but the hole diameter differs, or even if the hole diameter is the same, but the plate thickness differs, hole cutting is conducted in different cutting states. In other words, with the second embodiment, hole cutting is conducted in a cutting state based on both the hole diameter and the plate thickness. Therefore, the hole cutting quality can be further improved.

In the third preferred embodiment, in the apparatus of the second preferred embodiment, when the hole is cut, the control unit (36) conducts control so that the cutting speed is high, a value of the arc current is large, and a flow rate or pressure of the plasma gas is large if the ratio of the diameter of the hole to the plate thickness is large. Thus, if the hole diameter is large when the plate thickness is the same, and if the plate thickness is small when the hole diameter is the same, the control unit (36) conducts control so that the cutting speed is high, a value of the arc current is large, and a flow rate or pressure of the plasma gas is large if the ratio of the diameter of the hole to the plate thickness is large. With the third preferred embodiment, when the hole which is to be cut is such that the adverse effect of cutting delay and the like is hardly reflected on cutting quality, the hole cutting can be conducted at a high cutting speed and intensive gas spraying of the plasma arc (A). As a result, the production rate of the product can be increased, while maintaining good cutting quality of holes.

In the fourth preferred embodiment, when the contour is cut, the control unit (36) controls the cutting state based on the material type and plate thickness of the plate material (W) and a nozzle diameter of the plasma torch (6), and when the hole is cut, the control unit controls the cutting state based on the material type of the plate material (W), the plate thickness, the nozzle diameter, and a ratio of the diameter of the hole to the plate thickness. With the fourth preferred embodiment, contour cutting and hole cutting are conducted in an adequate cutting state corresponding to the material type and plate thickness of the plate material (W) and nozzle diameter. Therefore, cutting quality of the product can be further improved. In particular, in hole cutting, even when the ratio of the hole diameter to the plate thickness is the same, if at least one condition from the material type and plate thickness of the plate material (W) and nozzle diameter is different, cutting can be conducted in a separate adequate cutting state corresponding to this condition. Therefore, cutting quality of the product can be further improved.

In the fifth preferred embodiment, in the apparatus of the fourth preferred embodiment, when the hole is cut, the control unit (36) conducts control so that the cutting speed is high, a value of the arc current is large, and a flow rate or pressure of the plasma gas is large if the ratio of the diameter of the hole to the plate thickness is large. With the fifth preferred embodiment, when the hole which is to be cut is such that the adverse effect of cutting delay and the like is hardly reflected on cutting quality, the hole cutting can be conducted at a high cutting speed and intensive gas spraying of the plasma arc (A). As a result, the production rate of the product can be increased, while maintaining good cutting quality of holes.

In the sixth preferred embodiment, in the apparatus of the fourth preferred embodiment, the control unit (36) comprises control settings for contours and control settings for holes of a plurality of levels that differ in the ratio of a diameter of the hole to the plate thickness, for each combination of a material type of the plate material (W), a plate thickness of the plate material (W), and the diameter of the nozzle of the plasma torch (6). In this case, when a product is cut from a plate material (W) having given material type and plate thickness by using a plasma torch (6) having a given nozzle diameter, if a contour is cut, the control unit (36) controls the cutting state by using control settings for a contour that correspond to the given material type and plate thickness and the given nozzle diameter, and if a hole with a given diameter is cut, the control unit controls the cutting state by using control settings for holes with a level corresponding to a ratio of the given diameter to the given plate thickness, among control settings for holes with a plurality of levels corresponding to the given material type and plate thickness and the given nozzle diameter. With the sixth preferred embodiment, contour cutting is conducted in an adequate cutting state corresponding to a combination of the material type of the plate material (W), plate thickness of the plate material (W), and a diameter of the nozzle of the plasma torch (6). Therefore, contour cutting accuracy can be further improved. Furthermore, with this embodiment, hole cutting is conducted in an adequate cutting state corresponding to both the aforementioned combination and the level of hole corresponding to the ratio of hole diameter to plate thickness.

In the seventh preferred embodiment, the control unit (36) maintains the cutting state at a substantially fixed level even when the curvature of the movement path of the plasma torch (6) changes following the advance of cutting during contour cutting. If a cutting state is switched in the course of cutting, cutting quality sometimes can be degraded, for example, by a response delay from the moment of switching the cutting state to the moment the cutting state is actually assumed. However, with the seventh preferred embodiment, because a cutting state is maintained even if the curvature of the movement path of the plasma torch (6) changes following the advance of cutting during contour cutting, the degradation of cutting quality of the contour caused by switching of the cutting state can be effectively prevented.

The expression "maintains the cutting state at a substantially fixed level" means that even if the cutting state at the time of cutting start and end differs from that during cutting, such a situation is also included in the scope of the present embodiment. That is, for example, there are the following three intervals in plasma arc cutting: an interval from a moment immediately prior to igniting a pilot arc to the movement of the pilot arc to the main arc (hereinbelow referred to as "at cutting start"), an interval from the movement of the pilot arc to the main arc to cutting (hereinbelow referred to as "during cutting"), and an interval from the moment the main arc was extinguished to the moment the electrode temperature drops to a prescribed temperature (hereinbelow referred to as "at cutting end"). At cutting start and cutting end, the cutting state differs from that during cutting (for example, the flow rate or pressure of the plasma gas is less at cutting start (at the time of pre-flow) and at cutting end (at the time of post-flow) than during cutting (at the time of main flow). Thus, even when changes of the cutting state are implemented at cutting start or end, if the cutting state is not changed and maintained at a fixed level during cutting, the operational effect of this embodiment can be demonstrated. Accordingly, though the aforementioned changes of the cutting state has been implemented, this situation is included in that of "maintaining the cutting state at a substantially fixed level" (the same is true hereinbelow).

In the eighth preferred embodiment, the control unit (36) maintains the cutting state at a substantially fixed level even when the curvature of the movement path of the plasma torch (6) changes following the advance of cutting during cutting of one hole. If a cutting state is switched in the course of cutting, cutting quality sometimes can be degraded, for example by a response delay from the moment of switching the cutting state to the moment the cutting state is actually assumed. However, with the eighth preferred embodiment, because a cutting state is maintained even if the curvature of the movement path of the plasma torch (6) changes following the advance of cutting during cutting of the hole, the degradation of cutting quality of the contour caused by switching of the cutting state can be effectively prevented.

BRIEF DESCRIPTION OF THE DRAWINGS

FIG. 8 shows an example of an A code assignment table;

FIG. 9 shows an example of a control setting table;

DESCRIPTION OF THE PREFERRED EMBODIMENTS

Figure 4:
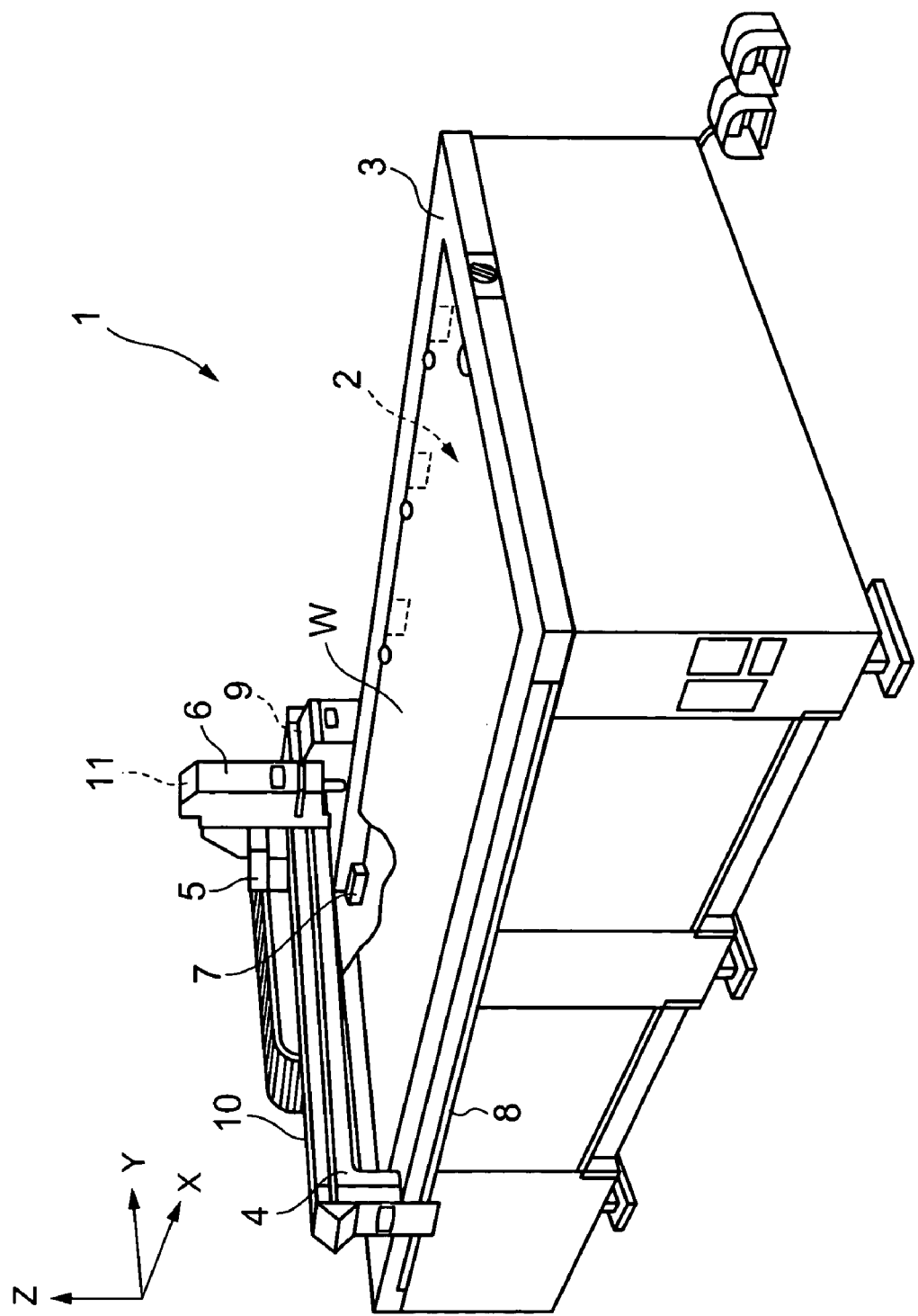
FIG. 4 shows an external appearance of the entire plasma cutting apparatus of an embodiment of the present invention.

FIG. 4 shows the external appearance of all the body components of the plasma cutting apparatus of the first embodiment of the present invention.

In the plasma cutting apparatus 1, a cutting table (cutting stand) 2 for supporting a plate material (W) is disposed in the inner space of a rectangular frame 3. A gate-like traveling beam 4 is disposed so as to extend over the frame 3. A carriage 5 is disposed on the traveling beam 4, and a plasma torch 6 is mounted on the carriage 5.

The traveling beam 4 can travel, when driven by an X axis motor 7, in the X axis direction along an X axis rail 8 disposed in the longitudinal direction (X axis direction), and the carriage 5 can travel, when driven by an Y axis motor 9, in the Y axis direction along an Y axis rail 10 disposed on the traveling beam 4. Furthermore, the plasma torch 6 can move, when driven by a Z axis motor 11, in the up-down direction (Z axis direction) with respect to the carriage 5. Thus, by controlling the motors 7, 9, 11, it is possible to conduct cutting of the plate material W by moving the plasma torch 6 to any position on the plate material (that is, a plate-like work) W and positioning it at any height.

A plasma gas (plasma main gas) supply apparatus, an assist gas (plasma assist gas) supply apparatus, an arc power source unit, a numerical control (NC) unit, and auxiliary and peripheral equipment thereof (none is shown in FIG. 4) are further connected or coupled with the body components shown in FIG. 4 (those units will be described hereinbelow with reference to FIG. 6).

Figure 5:
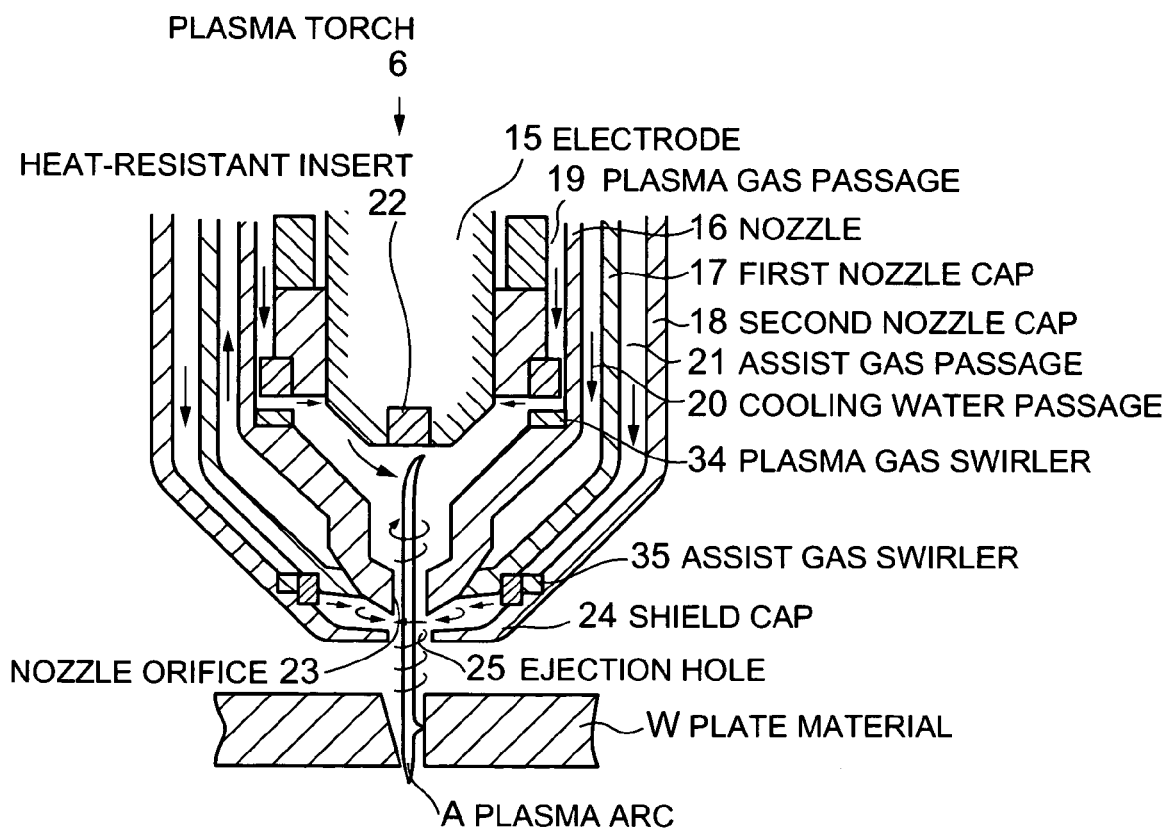
FIG. 5 is a cross-sectional view of a plasma torch 6.

FIG. 5 is a cross-sectional view of the plasma torch 6.

The plasma torch 6 has a multiwall round tubular shape and comprises an almost cylindrical electrode 15 disposed almost in the central part, a nozzle 16 of an almost round tubular shape disposed so as to cover the electrode 15 on the outer periphery thereof, a first nozzle cap 17 of an almost round tubular shape disposed on the outer periphery of the nozzle 16, and a second nozzle cap 18 of an almost round tubular shape disposed on the outer periphery of the first nozzle cap 17. A distal end open space formed between the electrode 15 and the nozzle 16 serves as a plasma gas passage 19, the closed space formed between the nozzle 16 and the first nozzle cap 17 serves as a cooling water passage 20, and a distal end open space formed between the first nozzle cap 17 and the second nozzle cap 18 serves as an assist gas passage 21.

A heat-resistant insert 22 made from a high-melting material (for example, hafnium, zirconium, and alloys) which is capable of withstanding large amount of heat generated by plasma arc is mounted on a distal end portion which is a plasma arc generation point of the electrode 15. Further, a nozzle orifice 23 is provided in the distal end portion of the nozzle 16, and plasma gas (for example, oxygen gas) supplied from the plasma gas passage 19 is ejected from this nozzle orifice 23 toward the plate material W. Moreover, a shield cap 24 is mounted on the distal end opening of the second nozzle cap 18, and assist gas (for example, air) supplied from the assist gas passage 21 is ejected from an ejection hole at the distal end of the shield cap 24.

A plasma gas swirler 34 for forming a swirling flow of the plasma gas passing through the plasma gas passage 19 and ejecting the swirling flow from the nozzle orifice 23 onto the plate material W is fit into the plasma gas passage 19. Similarly, an assist gas swirler 35 for forming a swirling flow of the assist gas passing through the assist gas passage 21 and ejecting the swirling flow from the nozzle orifice 25 onto the plate material W is fit into the assist gas passage 21. Those two swirling flows make it possible to change the shape of the cutting groove in the plate material W, and adjusting the supply rate of the plasma gas and assist gas allows for the adjustment of a bevel angle.

With the above-described configuration, if a pilot arc is ignited between the electrode 15 and the plate material W in a state in which the plasma gas was supplied to the plasma gas passage 19, the ionized plasma gas having electric conductivity is ejected to the plate material W via the nozzle orifice 23 and a plasma arc A is ignited between the electrode 15 and the plate material W. Because of effective action of the constriction induced by nozzle orifice 23 and a thermal pinch effect produced by the plasma gas flow, the plasma arc A has a high temperature and a high energy density. The plasma arc A thus obtained melts the plate material W and piercing and cutting are conducted.

Figure 6:
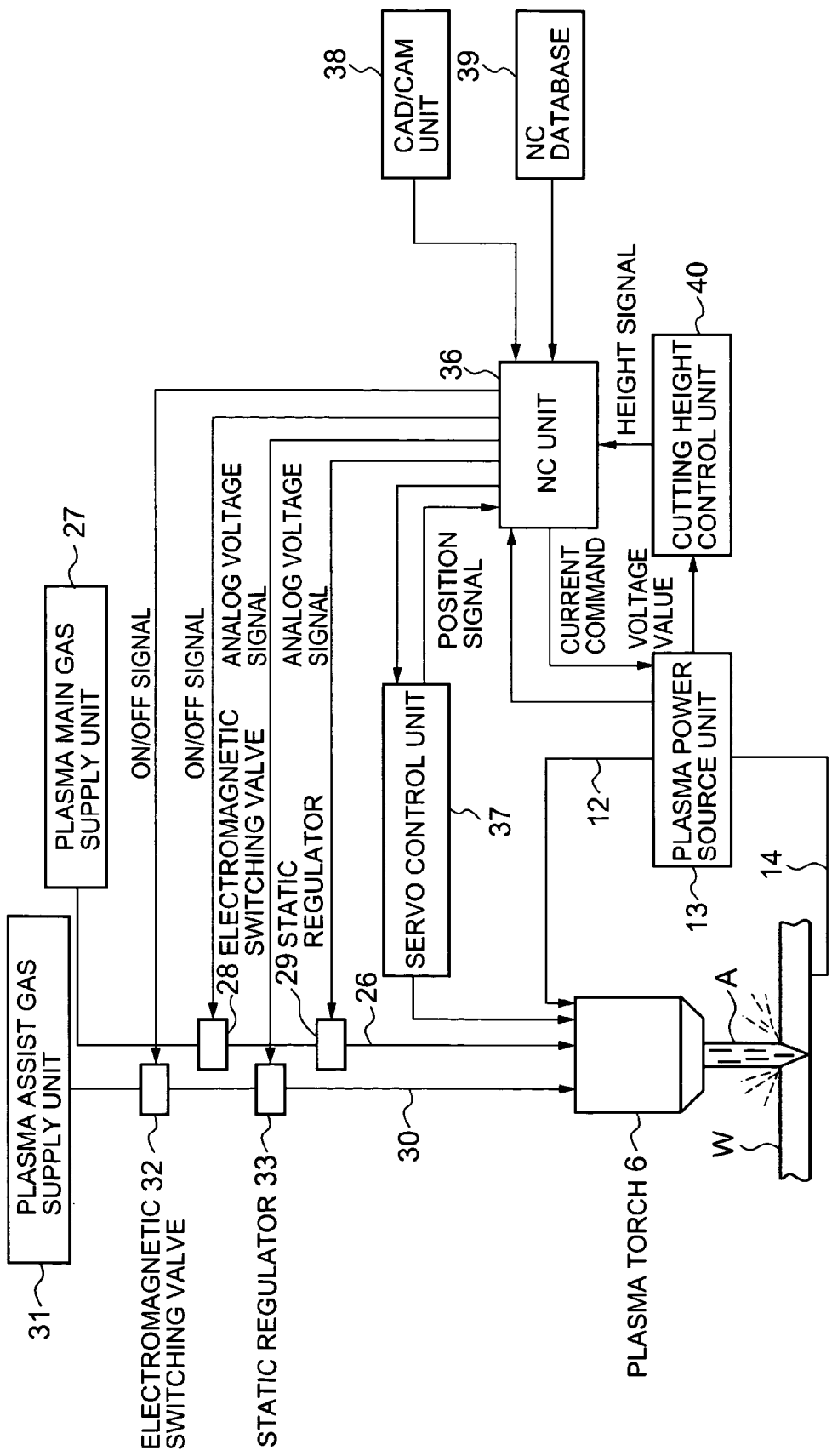
FIG. 6 is a block diagram illustrating the configuration of the plasma cutting apparatus 1 of the present embodiment.

FIG. 6 shows the entire system configuration in which the main components of the plasma cutting apparatus 1 in accordance with the present invention are combined with a plasma gas supply unit, an assist gas supply unit, an arc power source unit, an NC unit, and various auxiliary and peripheral equipment.

The plasma cutting apparatus 1 is equipped with a plasma gas supply line 26, an assist gas supply line 30, a servo control unit 37, a plasma power source unit 13, a cutting height control unit 40, an NC (Numerical Control) unit 36, a CAD/CAM device 38, an NC database 39, and an NC unit 36.

The plasma gas supply line 36 is a gas supply line for a plasma gas which is supplied from the plasma gas supply unit 27 to the plasma gas passage 19 of the plasma torch 6. An electromagnetic switching valve 28 for supplying and blocking the supply of the plasma gas by opening and closing a valve based on a signal from the NC unit 36 and a static regulator 29 for adjusting the pressure of the plasma gas (in other words, the amount of supplied plasma gas) based on an analog voltage signal from the NC unit 36 are introduced into the plasma gas supply line 26 in the order or description in the downstream direction thereof.

The assist gas supply line 30 is a gas supply line for an assist gas which is supplied from the assist gas supply unit 31 to the assist gas passage 21 of the plasma torch 6. An electromagnetic switching valve 32 for supplying and blocking the supply of the assist gas by opening and closing a valve based on a signal from the NC unit 36 and a static regulator 33 for adjusting the pressure of the assist gas (in other words, the amount of supplied assist gas) based on an analog voltage signal from the NC unit 36 are introduced into the assist gas supply line 30 in the order or description in the downstream direction thereof.

The servo control unit 37 controls the X axis motor 7, Y axis motor 9, and Z axis motor 11 that have been explained with reference to FIG. 4, based on control signals from the NC unit 36, thereby controlling the position (in other words, the height at the time of piercing and at the time of cutting) of the plasma torch 6 in the Z direction and movement (in other words, the movement path) of the plasma torch 6 in the XY direction.

One terminal (minus terminal) of the plasma power source unit 13, is connected to the electrode 15 of the torch 6 via a torch cable 12, and the other terminal (plus terminal) is connected to the plate material W (or cutting table 2) via a base material cable 14, thereby making it possible to supply an arc current by applying a voltage (referred to hereinbelow as "plasma arc voltage") between the electrode 15 of the plasma torch 6 and the plate material W. The plasma power source unit 13 controls the value of the arc current supplied to the plasma torch 6, based on the current command signal (in other words, a designated arc current value) from the NC unit 36. Furthermore, the plasma power source unit 13 inputs the value of the plasma arc voltage to the cutting height control unit 40 periodically or at the predetermined timing.

The cutting height control unit 40 is communicably connected to the NC device 36, computes the height of the plasma torch 6 based on the plasma arc voltage value inputted from the plasma power source unit 13 and inputs the height signal indicating the computed height into the NC unit 36.

A CAD/CAM device 38 is a computer system comprising a CAD (Computer-Aided Design) function and a CAM (Computer-Aided Manufacturing) function (it may be a personal computer having installed therein software demonstrating the CAD function or CAM function, or a special machine for demonstrating the CAD function and CAM function, or an independent machine physically separated from the plasma cutting apparatus 1 comprising the NC unit 36 and the like, or a machine that was communicably connected, for example, by a communication network, to the NC unit 36 and the like). The CAD/CAM unit 38 creates data (referred to hereinbelow as "product shape data") relating to the shape of the product which is to be cut from the plate material W or creates a computer program (referred to hereinbelow as "cutting control program") for controlling the cutting state of plasma arc cutting with the NC unit 36, based on the product shape data and the like. The created cutting control program is inputted into the NC unit 36 (the specific contents of the cutting control program is described hereinbelow) via a transportable recording medium such as CD-ROM or a predetermined medium such as a communication network.

The NC database 39 stores a control setting table having recorded therein the numerical values (referred to hereinbelow as "control settings") relating to conditions which are to be used for controlling the cutting state including the cutting speed, arc current value, plasma gas flow rate or pressure, and assist gas flow rate or pressure. The control setting table records the optimum control settings corresponding to respective variations of cutting conditions (for example, a combination of material type of the plate material, plate thickness, nozzle diameter, contour cutting or hole cutting, and a ratio of hole diameter and plate thickness in the case of hole cutting) and is referred to by the NC unit 36 by executing the cutting control program, thereby making it possible to select the optimum control settings which are to be set in accordance with specific cutting conditions at the time of cutting which is to be conducted according to the cutting control program and to set and identify those control settings in the NC unit 36 (the specific contents of the control setting table will be described hereinbelow).

The NC unit 36 inputs the cutting control program created by the CAD/CAM unit 38 and refers to the control setting table located in the NC database 39 by using this cutting control program, thereby selecting the optimum control settings which are to be used according to the cutting conditions that are designated by the cutting control program and setting and identifying those control settings as control settings which are to be used in cutting. Further, when cutting is conducted according to this cutting control program, the NC unit 36 controls the cutting conditions including the cutting speed, arc current value, plasma gas flow rate or pressure, and assist gas flow rate or pressure, based on the control settings thus set and identified. More specifically, when cutting speed is controlled, the NC unit 36 controls the cutting speed of the plasma torch 6 with the servo control unit 37 by inputting the control signal of any value in the servo control unit 37. Further, the NC unit 36 also controls the value of the arc current supplied to the plasma torch 6 with the plasma power source unit 13 by inputting a current command signal of any value to the plasma power source unit 13. The NC unit 36 also controls the plasma gas flow rate or pressure and assist gas flow rate pressure by inputting the ON/OFF signals in the electromagnetic switching valves 28, 32 and inputting an analog voltage signal of any value in static regulators 29, 33.

The plasma cutting unit 1 of the present embodiment was described hereinabove. The cutting control program created by the CAD/CAM unit 38 will be described below.

Figure 7:
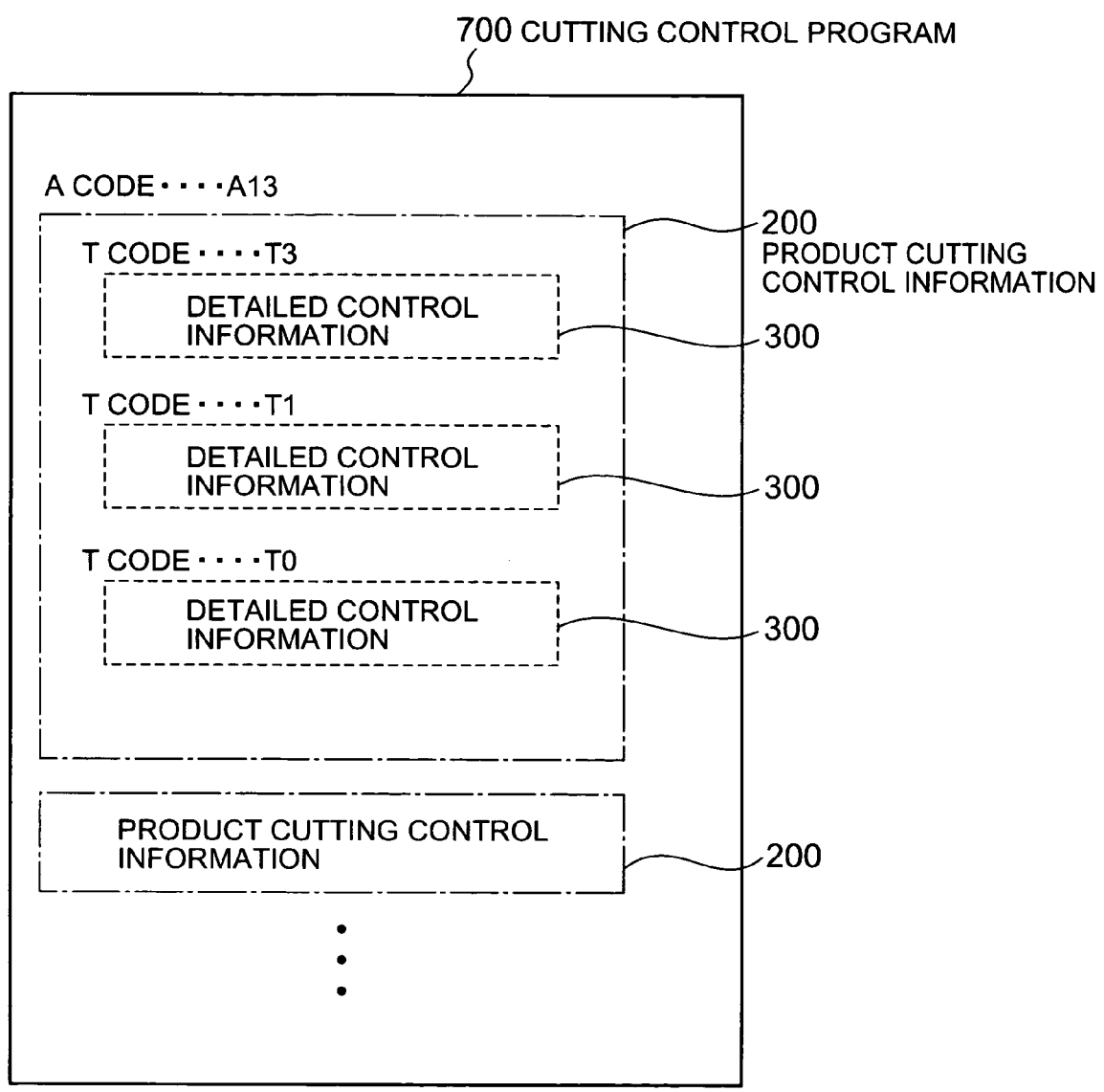
FIG. 7 shows an example of a cutting control program created with a CAD/CAM unit 38.

FIG. 7 shows an example of the cutting control program created by the CAD/CAM unit 38.

A cutting condition code (referred to hereinbelow as "A code") determined by the combination of material type and plate thickness of the plate material W used in the cutting operation conducted according to the cutting control program 700 and the nozzle size (for example, diameter) of the plasma torch 6, and a plurality of product cutting control information 200, 200 . . . corresponding to a plurality of products (or one product) which are to be cut in the cutting operation are described in the cutting control program 700.

The A code is determined by referring to an A code assignment table which describes A codes that were preliminary allocated for each combination of the material type (for example, soft steel, stainless steel, aluminum, and the like) of the plate material W, plate thickens (mm), and nozzle diameter (mm). That is, the CAD/CAM unit 38 causes that the user inputs the material type of the plate material W, plate thickness, and nozzle diameter, and extracts from the A code assignment table the A code corresponding to the plate material W, plate thickness, and nozzle diameter plate material W, plate thickness, and nozzle diameter that were inputted by the user (the A code assignment table is stored, for example, inside the CAD/CAM device 38 or an external storage device which is not shown in the figure). In the example illustrated by FIG. 8, the number of A codes described in one cutting control program 700 is one. Therefore, in the cutting operation carried out according to the cutting control program 700, initially, the plate material W of the same plate thickness and material type and the nozzle of the same diameter are used. However, for example, when the nozzle that was used in this cutting is replaced with other nozzle of a different diameter or when the plate material W used is replaced with a material of another plate thickness (or material type) in the course of the cutting operation executed by one cutting control program 700, then a plurality of A codes are described in the same cutting control program 700.

The number of product cutting control information 200 is identical to the total number of the products that will be cut in the cutting operation. For example, if products of one type are to be cut and the number of products that are cut is 20, then the number of product cutting control information 200 (in other words, a total number of the products which are to be cut) is 20, and if products of two types are to be cut and the number of products of each type is 10, then the number of product cutting control information is 20. A plurality of product cutting control information 200, 200 . . . are arranged, for example, in the order identical to the product cutting order.

For each element shape constituting the shape of the product (for example, in the case of a product having two holes, the shape of the product is composed of three element shapes: one contour and two holes), the product cutting control information 200 for each product comprises an element shape code (referred to hereinbelow as "T code" indicating whether the type of the element shape is contour or hole (if it is a hole, then of what level) and detailed control information 300 of the element shape. For example, in the case of a product having one hole and one contour, the T code and the detailed control information 300 of the hole and the T code and the detailed control information 300 of the contour are included in the product cutting control information 200 for the product. A set of T codes and detailed control information 300 of a plurality of element shapes of one product are arranged in the order in which those element shapes will be cut. In the case of a product having a hole and a contour, the set of the T code and the detailed control information 300 of the contour is arranged after the set of the T code and the detailed control information 300 of the hole.

As described hereinabove, the T code is a code indicating whether the element shape is a contour or a hole, and if it is a hole, then of what level. There are a plurality (for example, three) of hole levels correspondingly to the ratio of the hole diameter to the plate thickness of the plate material (referred to hereinbelow as "hole ratio"). The first hole level (this level will be hereinbelow referred to as "large level") indicates the largest hole ratio (that is, the hole diameter is the largest when the plate thickness is constant, or the plate thickness is the smallest if the hole diameter is constant). The second hole level (this level will be hereinbelow referred to as "small level") indicates the smallest hole ratio (that is, the hole diameter is the smallest when the plate thickness is constant, or the plate thickness is the largest if the hole diameter is constant). The third hole level (this level will be hereinbelow referred to as "intermediate level") indicates that the hole ratio is between that of the large level and that of the small level.

In the present embodiment, there are four T codes. The first T code indicates a product contour (denoted by "T0" in the figures"). The second T code indicates a large-level hole (denoted by "T1" in the figure). The third T code indicates an intermediate-level hole (denoted by "T2" in the figure"). The fourth T code indicates a small-level hole (denoted by "T3" in the figure").

The CAD/CAM 38 causes the user to input the product shape data including the hole diameter and the plate thickness of the plate material W and determines the T code which is to be employed, of those four T codes, based on the inputted data.

The detailed control information 300 written for each element shape is control information indicating in great detail the type and order of operation and position on the cutting stand 2 (that is, the table) of the plasma cutting apparatus 1 in which this operation will be executed. More specifically, for example, the detailed control information 300 comprises a code indicating piercing as the operation type, the coordinates of the piercing position on the cutting stand 2, then a code indicating that the plasma torch 6 is to be moved (that is, cutting is to be conducted) and the coordinates representing the movement path (cutting path), and finally a code indicating the termination of plasma arc generation and completion of cutting and the coordinates of the cutting end position on the cutting stand 2.

When such a cutting control program 700 is outputted from the CAD/CAM unit 38 and inputted to the NC unit 36, the NC unit 36 can select and set optimum control settings for cutting by using the A code and T code contained in the cutting control program and by referring to the control setting table present in the NC database 39.

FIG. 9 shows an example of a control setting table.

A plurality of control setting information corresponding respectively to a plurality of A codes (that is, a combination of material type of the plate material, plate thickness, and nozzle diameter) are recorded in the control setting table. Each control setting information comprises a plurality of control settings each corresponding to respective first to fourth T codes (that is, whether the element shape is a contour or a hole, and if a hole, then of what level). Examples of a plurality of control settings include arc current value, cutting speed, cutting height (height of the plasma torch during cutting), piercing height (height of the plasma torch during piercing), assist gas flow rate (or pressure), and plasma gas number (the plasma gas number indicates the flow rate or pressure of the plasma gas; for example, the gas number "1" represents 0.9 MPa, and gas number "2" represents 0.6 Mpa).

In the control setting table shown in the figure, the control setting information is recorded for each A code, and the cutting state of contour cutting and hole cutting is controlled based on various control setting value contained in the control setting information. The A code, as described hereinabove, was prepared for each combination of the material type of the plate material W, plate thickness, and nozzle diameter. Therefore, in this embodiment, the cutting state of contour cutting or hole cutting is controlled based on the material type of the plate material W, plate thickness, and nozzle diameter. More specifically, for example, even if the diameter of the hole which is the object of cutting is the same, even if one of the material type of the plate material W, plate thickness, and nozzle diameter is different, then contour cutting and hole cutting are conducted in a different cutting state.

Further, in the control setting table shown in the figure, in the same A code (that is, the combination of the material type of the plate material W, plate thickness, and nozzle diameter) the cutting speed corresponding to T code "T1" to "T3" (in other words, of hole cutting) is set lower than that corresponding to the T code "T0" (in other words, of contour cutting). Furthermore, in the same A code, the arc current value and plasma gas flow rate or pressure corresponding to the T code "T1" to "T3" are set lower than those corresponding to the T code "T0". During hole cutting, the control is conducted so that the cutting speed, value of arc current, and plasma gas flow rate or pressure are lower than those during contour cutting.

Furthermore, in the control setting table shown in the figure, in the same A code (that is, the combination of the material type of the plate material W, plate thickness, and nozzle diameter), the assist gas flow rate or pressure corresponding to T code "T1" to "T3" (in other words, of hole cutting) is set lower than that corresponding to the T code "T0" (in other words, of contour cutting). Therefore, during hole cutting, the control is conducted so that the assist gas flow rate or pressure are lower than those during contour cutting.

Further, in the control setting table shown in the figure, the smaller is the ratio of the hole diameter to the plate thickness (that is, when the hole level is "small"), the lower cutting speed, smaller arc current value, smaller plasma gas flow rate or pressure, and smaller assist gas flow rate or pressure are recorded. Therefore, in hole cutting when the plate thickness is the same (for example, when the A code is the same) and hole diameter is small, or when the hole diameter is the same and the plate thickness is large, the control is conducted so that the cutting speed is low, the arc current value is small, the plasma gas flow rate or pressure is low, and the assist gas flow rate or pressure is small.

A processing flow from the creation of product shape data for a product by using the CAD/CAM unit 38 to cutting the product in the plasma cutting apparatus 1 will be descried below. To facilitate understanding of the processing flow, in this explanation an assumption is made that one plate material W will be cut.

(1) Creation of Product Shape Data

The CAD/CAM unit 38 operated by the user creates the product shape data relating to the design of the shape of the product which is to be cut and stored the created product shape data in a prescribed storage unit (not shown in the figure). The product shape data are, for example, data of the format called DXF (Drawing Interchange File), and include at least data representing the contour outline or size (dimensions) of the product. When the product shape has one or several holes, the product shape data, for example, include data representing the hole outline, hole diameter, and position (coordinates) of the hole in the product contour for each hole.

(2) Creation of Cutting Control Program (2-1) Input of Product Shape Data

The CAD/CAM unit 38 causes the user to input the product shape data for a product which is to be cut out from the plate material W. A method for inputting the product shape data, for example, comprises the steps of displaying the product shape data of at least one type that were recorded in advance on a display screen, causing the user to select the desired one or a plurality of product shape data from those product shape data of at least one type, and inputting the selected one or a plurality of product shape data as the product shape data of the product which to be cut.

(2-2) Input of Size (Longitudinal and Lateral Dimensions) of the Plate Material W, Material Type, Plate Thickness, and Nozzle Diameter Further, in order to create the cutting control program 700, the CAD/CAM unit 38 also cause the user to input the size (longitudinal and lateral dimensions) of the plate material W which is to be cut in the cutting operation carried out according to the cutting control program 700, the material type of the plate material W, the plate thickness of the plate material W, and the nozzle diameter of plasma torch 6.

(2-3) Nesting Processing and Determination of Product Cutting Order

The CAD/CAM unit 38 causes the user to input the number of the products to be cut, which is represented by the product shape data for each product shape data that was inputted, and then executes a nesting processing.

Thus, the CAD/CAM 38, based on the inputted one or a plurality of product shape data, number of product of each type which are to be cut, and size of the plate material W, arranges cutting lines of the product which is to be cut on the plate material W so as to minimize the portions (scrap) other than the product which is to be cut from the plate material W.

Further, the CAD/CAM unit 38 determines the product cutting order.

(2-4) Determination of Product Cutting Control Information 200 for each A Code and Product that will be Cut First, the CAD/CAM unit 38 refers to the A code assignment table (see FIG. 8) by using the material type of the plate material W, plate thickness, and nozzle diameter that were inputted by the user, and extracts an A code corresponding to the combination of those material type, plate thickness, and nozzle diameter.

Then, the CAD/CAM unit 38 determines the product cutting control information 200 for each product that will be cut.

Thus, the CAD/CAM unit 38 provides a T code for each cutting object of the product (that is, for each element shape such as a contour and a hole).

Figure 10:
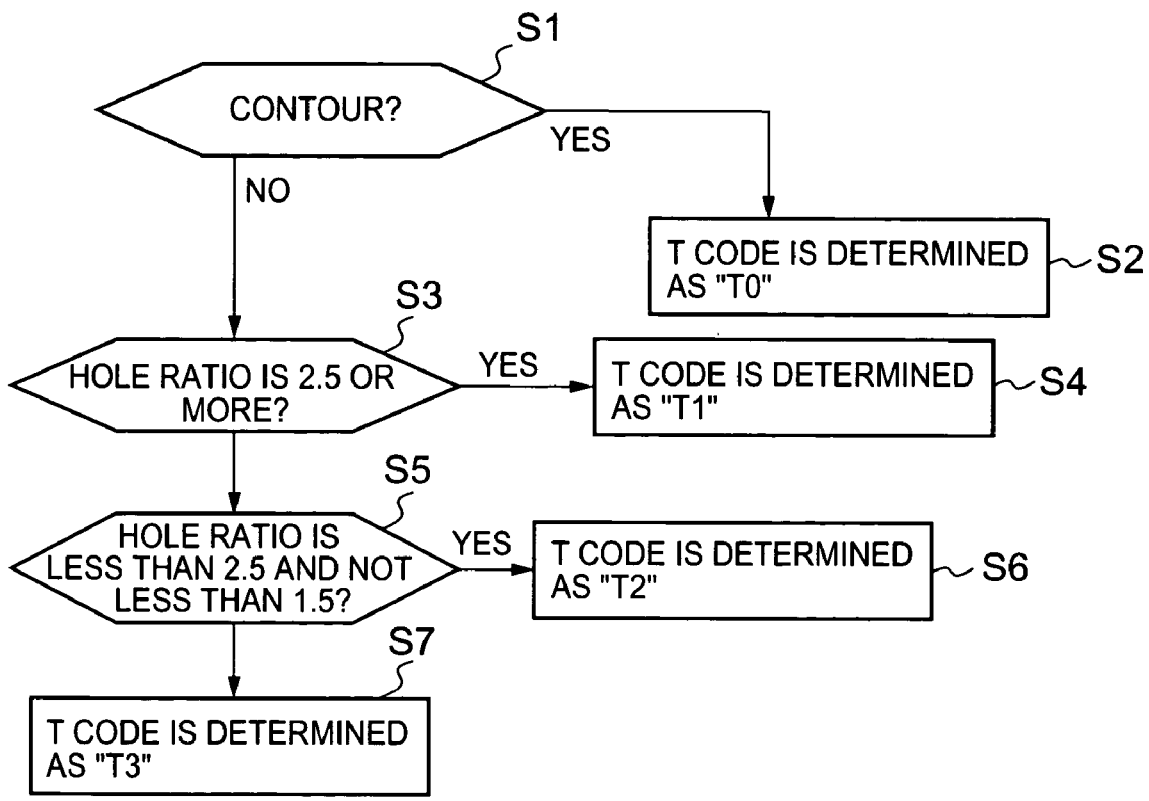
FIG. 10 is a flow chart relating to evaluation of a T code assigned to an element shape.

More specifically, as shown in FIG. 10, the CAD/CAM unit 38 recognizes the element shape by referring to the product shape data inputted by the user and decides as to whether the element shape is a contour or a hole (step S1). When a resultant decision is made that the element shape is a contour (Y in S1), the CAD/CAM unit 38 provides a T code "T0" representing the contour for the recognized element shape (S2).

Figure 1:
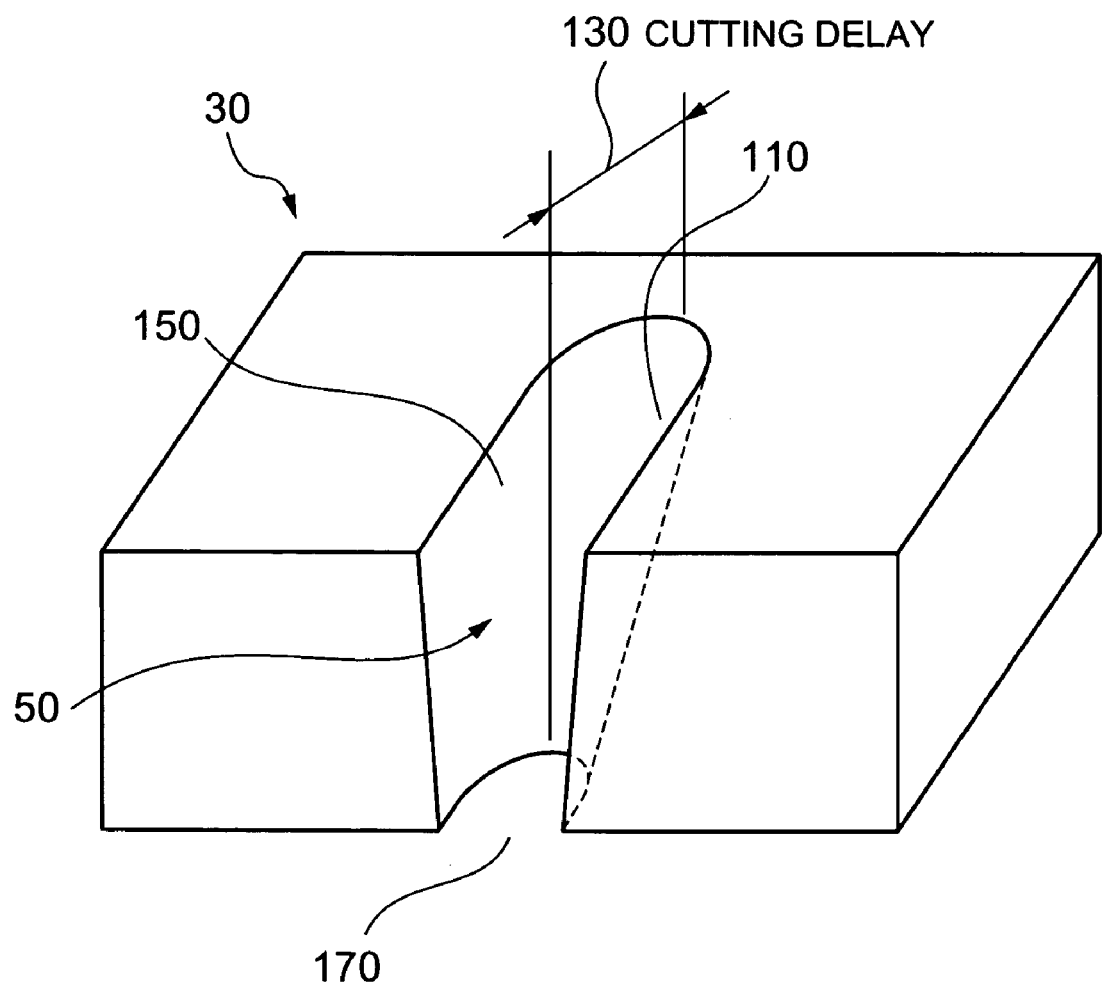
FIG. 1 shows a cutting surface obtained when cutting delay has occurred.
Figure 2:
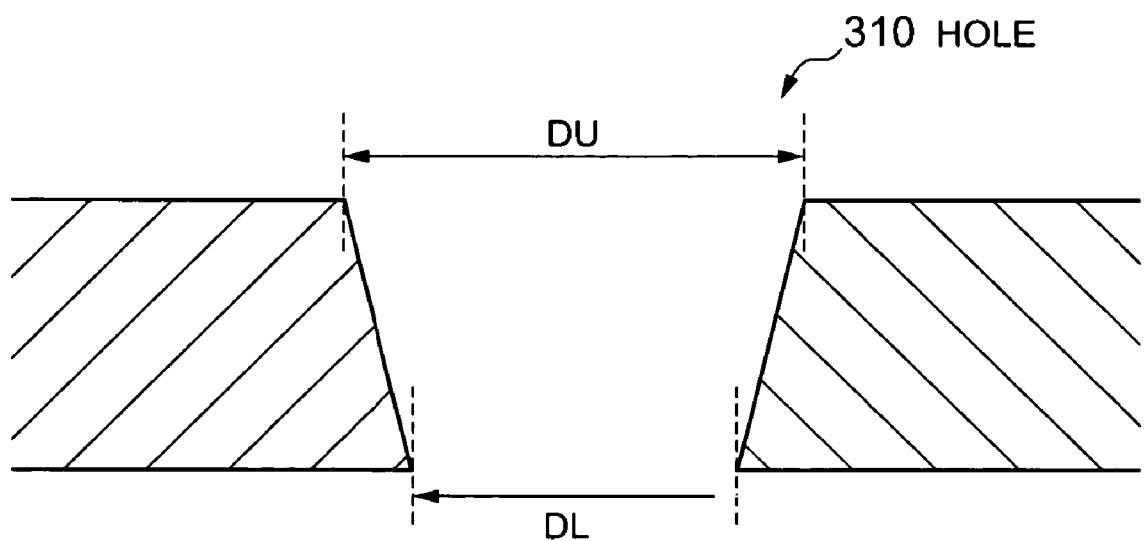
FIG. 2 shows an example of a cross section when a hole is cut.
Figure 3:
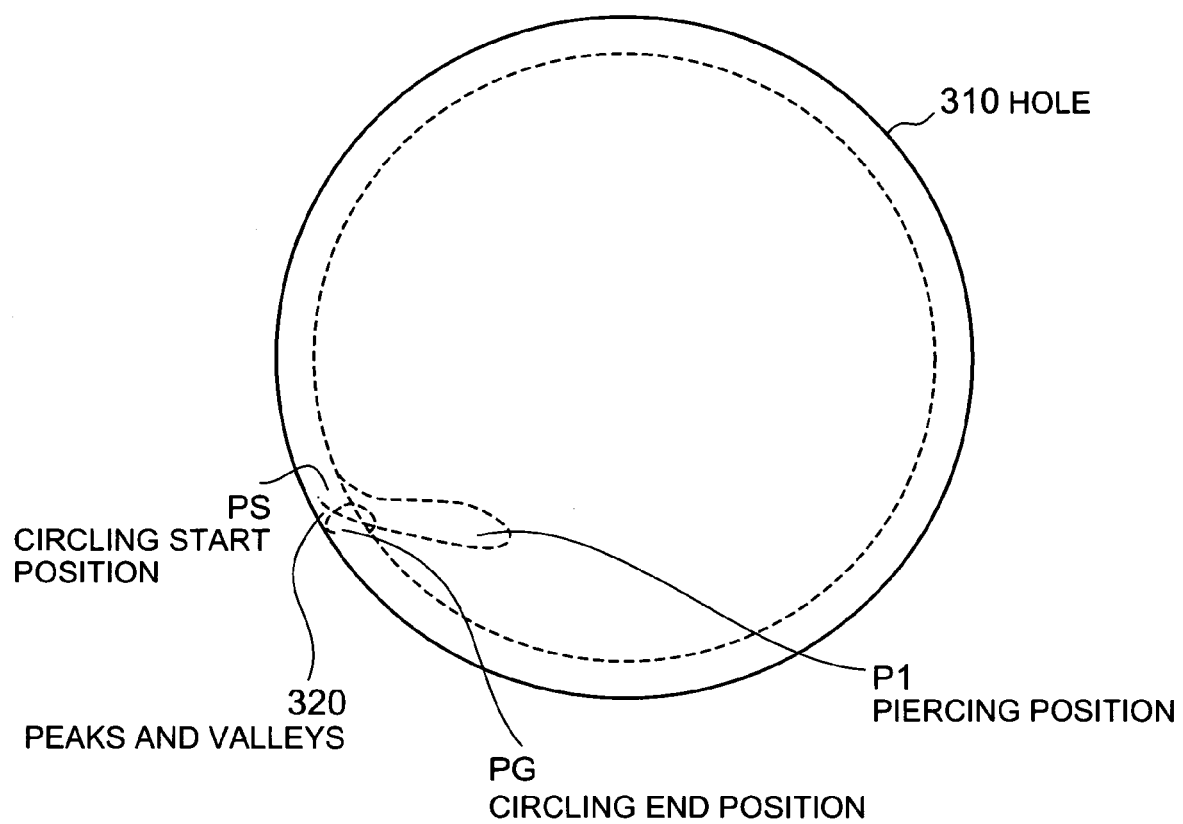
FIG. 3 shows a movement path during hole cutting and peaks and valleys appearing in a hole as a result of cutting.

When in step S1 a decision is made that the recognized element shape is a hole (N in S2), the CAD/CAM unit 38 calculates a hole ratio of the hole (that is, a ratio of the hole diameter to the plate thickness) by using the plate thickness that was inputted by the user and the diameter of the hole contained in the product shape data, and determines a T code that will be provided to the recognized element shape based on the calculated hole ratio. For example, as shown in FIG. 1, if the calculated hole ratio is not less than the first threshold (for example, 2.5) (Y in S3), the CAD/CAM unit 38 provides a T code "T1" representing a large-level hole (S4), if the hole ratio is less than the first threshold (for example 2.5) but not less than the second threshold (for example, 1.5) (N in S3 and Y in S5), the unit provides a T code "T2" representing an intermediate-level hole (S6), and if the hole ratio is less than the second threshold (for example, 1.5) (N in S3 and N in S5), the unit provides a T code "T3" representing a small-level hole.

Once the T codes have been provided for each element shape of the product by the above-described procedure, the CAD/CAM unit 38 determines the detailed control information 300 indicating in great detail the type and order of operation and the position on the cutting stand 2 (that is, the table) of the plasma cutting apparatus 1 during cutting of the element shape for each element shape of the product.

(2-5) Generation and Output of Cutting Control Program

Once the A code or the product cutting control information 200 relating to each product that will be cut (that is, information including a set of a T code for each element shape of the product and the detailed control information 300) has been determined, the CAD/CAM unit 38 generates a cutting control program 700 comprising the A code, the product cutting control information 200 relating to each product that will be cut, and the product cutting order (see FIG. 7). Then, the CAD/CAM unit 38 outputs the cutting control program 700 to a portable recording medium such as a flexible disk, or transmits it to the NC unit 36 via a communication network.

(3) Product Cutting

Figure 11:
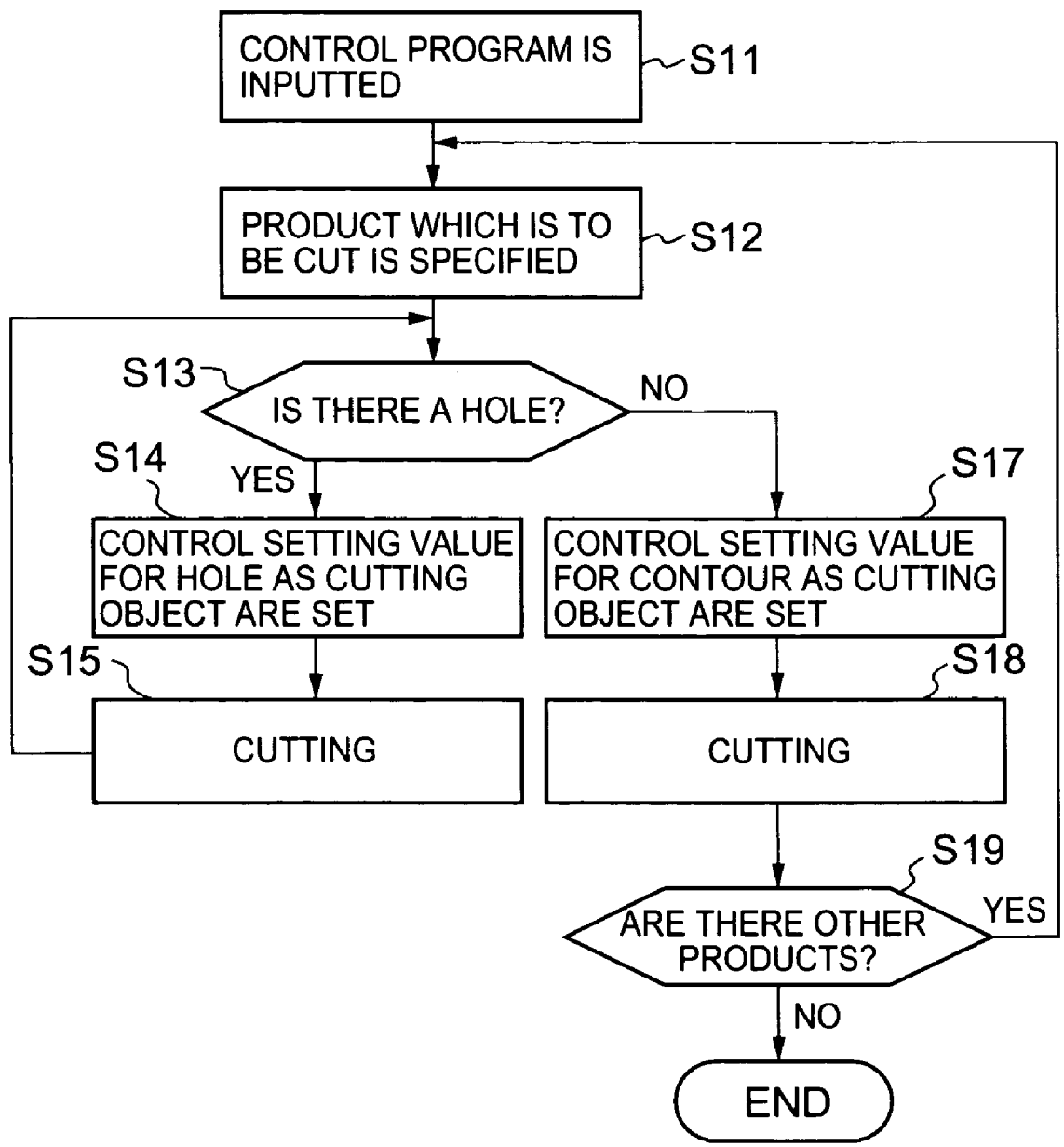
FIG. 11 shows an operation flow of an NC unit in cutting processing of the product.

FIG. 11 illustrates the operation flow of the NC unit in the product cutting.

If the cutting control program 700 in inputted in the NC unit 36 (S11), the NC unit 36 specifies a product cutting order and a product which is to be cut thereby by referring to the cutting control program 700 (S12). Then, the NC unit 36 starts cutting operation of the product. For example, when the product shape comprises a hole in addition to a contour (Y in S13), the hole is cut in the product according to the order indicated in the product cutting control information 200 of the product.

Thus, the NC unit 36 controls the servo control unit 37 based on the detailed control information 300 corresponding to the hole that is the object of cutting, which has been described in the cutting control program 700 inputted in S11, and moves the plasma torch 6 to the piercing position. Further, in parallel with this processing (or upon completion of this processing), the NC unit 36 refers to the control setting table present in the NC database 39, reads the A code contained in the cutting control program 700 that was inputted in S11 (that is, the A code corresponding to a combination of the material type and plate thickness of the plate material W which is to be cut and the diameter of the nozzle used) and a plurality of control settings values (for example, cutting speed, arc current value, plasma gas flow rate or pressure, and assist gas flow rate or pressure) corresponding to the T code of the hole, which is the cutting object from this control setting table and sets a plurality of the control settings values that were read out into a prescribed storage device (for example, a register) (S14). The NC 36 then conducts hole cutting, while controlling the cutting state based on the control settings values thus set (S15).

More specifically, for example, the NC unit 36 controls the height of the plasma torch 6 so that it becomes a pierce height which is one of the control settings that were set. Then, the NC unit 36 carries out piercing processing based on the control information determined by the detailed control information 300 for the hole, which is the cutting object, and carries out piercing of the plate material W.

The NC unit 36 then controls the height of the plasma torch 6 so that it becomes the cutting height which is one of the control settings that were set in S14 in the position where piercing was conducted. Then, the NC unit 36 conducts cutting of the hole having the prescribed diameter by moving the plasma torch along the movement path (cutting path) written in the detailed control information 300 of the hole, which is the cutting object) and at a cutting speed that was set in S14 (for example, by moving the plasma torch from the piercing position to the prescribed circling start position on a hole outline and then rotating the plasma torch from this position along the hole outline). When the plasma torch 6 is thus moved, the NC unit 36 conducts control so that the cutting speed, the value of arc current supplied to the plasma torch 6, the plasma gas flow rate (or pressure) and the assist gas flow rate (or pressure) become equal to the cutting speed, arc current value, plasma gas flow rate or pressure, and assist gas flow rate or pressure that were set in S14 and are maintained. In other words, the NC 36 ensures that even if the curvature of the movement path of the plasma torch 6 changes during cutting (at least, on the aforementioned circle of the plasma torch), cutting speed, arc current value, plasma gas flow rate or pressure, and assist gas flow rate or pressure that were set in S14 do not change to different numerical values (during piercing, in the course of torch movement from the piercing position to the circling start position, or when the circling end position is reached, cutting may be conducted in a cutting state different from the cutting state based on the control settings that were set in S14).

The NC unit 36 conducts hole cutting following the above-described procedure. When a plurality of holes are present in the product, the steps S13-S15 are repeated till all the holes are cut.

When the steps S13 to S15 are repeated, if the hole level is low (that is, if the hole ratio is small), the control is carried out so that the cutting speed is low, the arc current value is small, the plasma gas flow rate or pressure is low, and the assist gas flow rate or pressure is low.

Further, once the NC unit 36 has completed cutting of all the holes (or if there are no holes in the product shape) (N in S13), it conducts contour cutting. The flow of this cutting operation is similar to that implemented during hole cutting. Thus, the NC unit 36 reads the A code contained in the cutting control program 700 that was inputted in S11 (that is, the A code corresponding to a combination of the material type and plate thickness of the plate material W which is to be cut and the diameter of the nozzle used) and a plurality of control settings corresponding to the T code "T0" of the contour, which is the cutting object from this control setting table present in the NC data base 39 and sets the read-out data (S17). Then, the NC unit 36 cuts the contour by moving the plasma torch 6 at a cutting speed set in S17 and along the cutting path written in the detailed control information 300 of the contour which is the object of cutting (S18). When the plasma torch 6 is thus moved, the NC unit 36 conducts control so that the cutting speed, the value of arc current supplied to the plasma torch 6, the plasma gas flow rate (or pressure) and the assist gas flow rate (or pressure) become equal to the cutting speed, arc current value, plasma gas flow rate or pressure, and assist gas flow rate or pressure that were set in S17 and are maintained.

If there are still products which are to be cut (Y in S19), the above-described processing of S12 to S18 is conducted and once all the products have been cut (N in S19), the processing is ended.

The present embodiment was described hereinbelow.

In the present embodiment when a hole is cut, the control setting values (that is, cutting speed or arc current value) are changed in a stepwise manner according to the ratio of the hole diameter to the plate thickness. However, they may be instead changed in a continuous manner. More specifically, for example, linear graph data representing the relationship between the hole ratio and various control settings (cutting speed or arc current value) may be recorded in the NC database 39, and the control settings for hole cutting may be determined based on this graph data.

Further, the NC unit 36 may contain a display screen, display the control settings on the display screen when the control settings are set in S14 and S17, and cause the user to acknowledge those control settings, or the control settings that were displayed may be changed manually.

Further, as shown in the control setting table in FIG. 9, a high speed mode and a low-speed mode with a cutting speed lower than that of the high-speed mode (furthermore, for example, at least one parameter form the arc current value, plasma gas flow rate or pressure, and assist gas flow rate or pressure is also lower) may be prepared for contour cutting, and in this case the NC device 36 may automatically select the high-speed mode or the low-speed mode based on the shape of the contour, or the user may make the selection manually. In the case of the high-speed mode, the control is necessarily conducted such that the cutting speed is higher, the arc current value is lower, the plasma gas flow rate or pressure is higher, and the assist gas flow rate or pressure is higher than those during hole cutting (such a control is not necessary in the case of the low-speed mode).

With the above-described embodiment, when a hole is cut, the control is conducted so that the cutting speed is lower, the arc current value is lower, and the plasma gas flow rate or pressure is lower than those during contour cutting. Thus, when a hole is cut, the cutting speed is lower than during contour cutting. Therefore, the effect produced by cutting delay on cutting quality can be reduced. Furthermore, because the arc current value and the plasma gas flow rate or pressure decrease following the decrease in the cutting speed, when a hole is cut, gas spraying of plasma arc is weakened with respect to that during contour cutting. For this reason, a negative effect produced on the cutting quality by cutting delay, pressure balance on the right and left sides of the plasma arc, nozzle degradation, and peaks and valleys that can appear on the cutting surface (referred to hereinbelow as "cutting delay and the like") can be reduced (for example, peaks and valleys that can appear on the cutting surface can be made small enough to be invisible or can be substantially eliminated).

Further, with the above-described embodiment, during hole cutting, the assist gas flow rate or pressure is also controlled so as to be less than that during contour cutting. As a result, a negative effect produced by cutting delay and the like on cutting quality can be further reduced.

Moreover, with the above-described embodiment, the control is conducted so that the cutting speed is lowered, the arc current value is lowered, and the plasma arc gas flow rate or pressure is lowered (the control is also conducted so that the assist gas flow rate or pressure is lowered) with the decrease in the ratio of the hole diameter to the plate thickness. If the hole diameter is decreased at the same plate thickness or the plate thickness is increased at the same hole diameter, the degree of negative effect produced by the cutting delay or the like on cutting quality is increased. With the present embodiment, as described above, the control is conducted so that the cutting speed is lowered, the arc current value is lowered, and the plasma gas flow rate or pressure is also lowered when the hole ratio is small. As a result, cutting quality of the hole can be further improved.

Moreover, with the above-described embodiment, the cutting state during cutting is controlled based on the material type and plate thickness of the plate material W and the nozzle diameter of the plasma torch 6. As a result, contour cutting and hole cutting are conducted in a more adequate cutting state corresponding to the material type and plate thickness of the plate material W and nozzle diameter. Therefore, cutting quality of the product can be further improved.

Furthermore, with the above-described embodiment, the control unit 36 maintains a substantially constant cutting state (in other words, prevents the control settings that have once been set from changing) even if the curvature of the movement path of the plasma torch 6 changes in the course of cutting during contour and hole cutting (for example, at least in circling of the plasma torch 6). As a result, degradation of cutting quality that can occur due to switching of the cutting state during cutting can be effectively prevented.

The preferred embodiments of the present invention were described hereinabove. However, those embodiments were merely illustrative examples employed to explain the present invention and the scope of the present invention is not limited to those embodiments. The present invention can be implemented in various other modes, without departing from the essence thereof.

What is claimed is:

1. A plasma cutting apparatus for cutting a product from a plate material by moving a plasma torch at a cutting speed along a cutting path corresponding to the product shape to cut said plate material, while supplying an arc current and a plasma gas to said plasma torch and forming a plasma arc from a nozzle of said plasma torch to the plate material, said plasma cutting apparatus comprising a control unit for controlling a cutting state including said cutting speed, a value of said arc current, and a flow rate or pressure of said plasma gas, wherein said control unit conducts control so that, when the shape of said product comprises a hole and a contour and when said hole is cut, said cutting speed is lower, a value of said arc current is smaller, and a flow rate or pressure of said plasma gas is less than those when said contour is cut, wherein when said hole is cut, said control unit controls said cutting state according to a ratio of the plate thickness of said plate material and the diameter of said hole.

2. The plasma cutting apparatus according to claim 1, wherein an assist gas is further supplied to said plasma torch, and said control unit conducts control so that when said hole is cut, the flow rate or pressure of said assist gas is less than that when said contour is cut.

3. The plasma cutting apparatus according to claim 1, wherein when said hole is cut, said control unit conducts control so that said cutting speed is high, a value of said arc current is large, and a flow rate or pressure of said plasma gas is large if the ratio of the diameter of said hole to said plate thickness is large.

4. The plasma cutting apparatus according to claim 1, wherein when said contour is cut, said control unit controls said cutting state based on the material type and plate thickness of said plate material and a nozzle diameter of said plasma torch, and when said hole is cut, said control unit controls said cutting state based on the material type of said plate material, said plate thickness, said nozzle diameter, and a ratio of the diameter of said hole to said plate thickness.

5. The plasma cutting apparatus according to claim 4, wherein when said hole is cut, said control unit conducts control so that said cutting speed is high, a value of said arc current is large, and a flow rate or pressure of said plasma gas is large if the ratio of the diameter of said hole to said plate thickness is large.

6. The plasma cutting apparatus according to claim 4, wherein said control unit comprises
control settings for contours and control settings for holes of a plurality of levels that differ in the ratio of the diameter of said hole to said plate thickness, for each combination of a material type of said plate material, a plate thickness of said plate material, and the diameter of said nozzle of said plasma torch, and
when a product is cut from a plate material having given material type and plate thickness by using a plasma torch having a given nozzle diameter, if a contour is cut, said control unit controls said cutting state by using the control settings for contours that correspond to said given material type and plate thickness and said given nozzle diameter, and if a hole with a given diameter is cut, said control unit controls said cutting state by using control settings for holes with a level corresponding to a ratio of said given diameter to said given plate thickness, among control settings for holes with said plurality of levels corresponding to said given material type and plate thickness and said given nozzle diameter.

7. The plasma cutting apparatus according to claim 1, wherein said control unit maintains said cutting state at a substantially fixed level even when the curvature of said movement path of said plasma torch changes following the advance of cutting during cutting of said contour.

8. The plasma cutting apparatus according to claim 1, wherein said control unit maintains said cutting state at a substantially fixed level even when the curvature of said movement path of said plasma torch changes following the advance of cutting during cutting of one said hole.

9. The plasma cutting apparatus according to claim 1, wherein said control unit controls said cutting state based on a relationship between the thickness of the plate and the diameter of said hole.

10. A plasma cutting apparatus for cutting a product from a plate material by moving a plasma torch at a cutting speed along a cutting path corresponding to the product shape to cut said plate material, while supplying an arc current and a plasma gas to said plasma torch and forming a plasma arc from a nozzle of said plasma torch to the plate material, said plasma cutting apparatus comprising a control unit for controlling a cutting state based on a ratio of the thickness of the plate and the diameter of said hole, said cutting state includes said cutting speed, a value of said arc current, and a flow rate or pressure of said plasma gas.

11. The control unit for controlling the plasma cutting apparatus described in claim 9 or claim 10.

12. A plasma cutting method for cutting a product from a plate material by moving a plasma torch at a cutting speed along a cutting path corresponding to the product shape to cut said plate material, while supplying an arc current and a plasma gas to said plasma torch and forming a plasma arc from a nozzle of said plasma torch to the plate material, wherein when the shape of said product comprises a hole and a contour, said method comprises the steps of cutting said hole by controlling a cutting state including said cutting speed, a value of said arc current, and a flow rate or pressure of said plasma gas, and by controlling said cutting state according to a ratio of the plate thickness of the plate material and the diameter of said hole, and cutting said contour by controlling said cutting conditions, and in the step of cutting said hole, said cutting speed is lower, a value of said arc current is smaller, and a flow rate or pressure of said plasma gas is less than those when said contour is cut.

13. The plasma cutting method according to claim 12, wherein the step of cutting said hole includes the controlling of said cutting state based on a relationship between the thickness of the plate and the diameter of said hole.

14. A plasma cutting method for cutting a product from a plate material by moving a plasma torch at a cutting speed along a cutting path corresponding to the product shape to cut said plate material, while supplying an arc current and a plasma gas to said plasma torch and forming a plasma arc from a nozzle of said plasma torch to the plate material, wherein said method comprises the steps of:

cutting said hole by controlling a cutting state including said cutting speed, a value of said arc current, and a flow rate or pressure of said plasma gas, wherein the step of cutting said hole includes the controlling of said cutting state based on a ratio of the thickness of the plate and the diameter of said hole, and cutting said contour by controlling said cutting conditions.

* * * * *